United States Patent [19]

Odenthal

[11] Patent Number: 4,988,263

[45] Date of Patent: Jan. 29, 1991

[54] APPARATUS FOR THE DESTACKING OF PALLETS

[75] Inventor: Heinz F. Odenthal, Zülpich, Fed. Rep. of Germany

[73] Assignee: Ostma Maschinebau GmbH, Zülpich, Fed. Rep. of Germany

[21] Appl. No.: 422,391

[22] Filed: Oct. 16, 1989

[30] Foreign Application Priority Data

Oct. 15, 1988 [DE] Fed. Rep. of Germany ....... 3835268

[51] Int. Cl.⁵ .............................................. B65G 59/02
[52] U.S. Cl. .............................. 414/795.8; 414/796.7; 414/796.9; 414/924; 414/929
[58] Field of Search ............... 414/795.8, 796.7, 796.8, 414/924, 798.9, 929, 928, 796.9, 797, 797.1

[56] References Cited

U.S. PATENT DOCUMENTS

| | | | |
|---|---|---|---|
| 3,603,463 | 9/1971 | Billett et al. ................... | 414/797 X |
| 4,192,496 | 3/1980 | Baselie et al. ................. | 414/795.8 X |
| 4,457,658 | 7/1984 | Meylan .......................... | 414/929 X |

FOREIGN PATENT DOCUMENTS

| | | | |
|---|---|---|---|
| 0098681 | 8/1978 | Japan ........................... | 414/796.9 |
| 0098682 | 8/1978 | Japan ........................... | 414/796.9 |
| 0088719 | 4/1987 | Japan ........................... | 414/796.7 |

*Primary Examiner*—Robert P. Olszewski
*Assistant Examiner*—William M. Hienz
*Attorney, Agent, or Firm*—Herbert Dubno

[57] ABSTRACT

A destacking apparatus for stacked pallets has at the destacking station not only a raisable and lowerable destacking platform but at least a raisable and lowerable receiving platform upstream of the destacking platform so that, when the destacking platform is brought to its lowest position, a stacked pallet from the receiving platform can be transferred onto it. Because the receiving platform can receive the stacked pallets at a higher location or level, the time previously required for moving the stacked platform down from this higher level to a position in which destacking can begin from the top of the stack is eliminated and the entire operation is expedited.

6 Claims, 3 Drawing Sheets

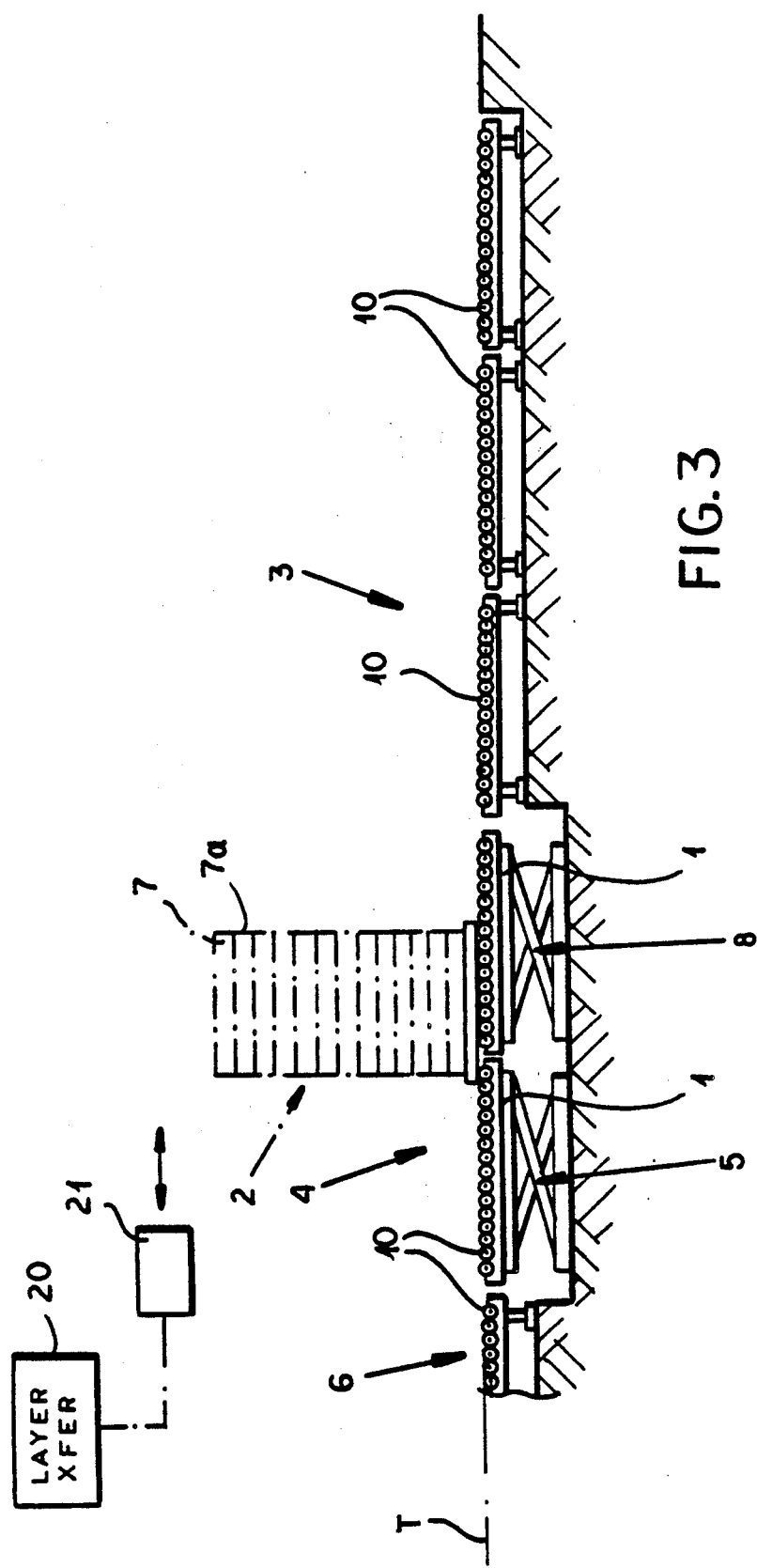

APPARATUS FOR THE DESTACKING OF PALLETS

FIELD OF THE INVENTION

My present invention relates to an apparatus for the destacking of pallets and, more particularly, to an apparatus for processing palletized goods or articles, i.e. articles stacked upon a pallet, so as to feed those articles individually from the stack and thereby empty the pallet.

BACKGROUND OF THE INVENTION

Increasingly for the handling of stackable materials, e.g. paper, cardboard, paperboard and other sheet materials, the sheet materials are bundled to form a stack and the stack can be provided on a pallet. The stack may originally be strapped to the pallet or can be wrapped to hold the stack together and the palletized stack, i.e. the pallet with the stack thereon, can readily be shifted by a forklift truck or other forklift type of device, e.g. a fork-hoist, capable of lifting the pallet, moving the pallet with the stack thereon along the ground or floor, lowering the pallet and even placing one palletized stack above another. The palletizing of such stacks thus has been found to greatly enhance the ease with which the stack can be moved about, positioned and ultimately delivered to a machine or line in which the individual articles may be utilized.

At this point, the palletized stack must be broken down, i.e. the articles removed from the stack or, as stated otherwise, the pallet stacked with stackable elements, especially paper, must be destacked.

A conventional system for this purpose comprises a feed conveyor for advancing the pallet stacked with the stackable elements, e.g. paper, hereinafter referred to as a stacked pallet, to a destacking station, a destacking station to which the stacked pallets are supplied by the conveyor with a predetermined destacking level and a destacking table which can receive the stacked pallets in succession and is capable of raising and lowering so that the uppermost element of the stack may be brought to the destacking level, and a discharge conveyor for carrying off the destacked pallet, i.e. an empty pallet from which all of the elements of the stack have been removed.

The destacking level can, for example, be the feed level of a machine to be charged with the individual elements of the stack, e.g. a packaging machine, printing machine or package-making machine are fed with the individual elements as they are removed from the stack at this level. The removal of the elements at this level can be effected automatically with corresponding means, e.g. suction grippers, or by hand in the conventional apparatus and this type, only the destacking table is provided at the destacking station and it is moved between its lowest table level and a highest table level alternately based upon the height of the stack and directly receives the stacked pallet from the feed conveyor and directly transfers the destacked or empty pallet to the discharge conveyor.

The feed conveyor and discharge conveyor can be located at the same level and this latter level, at which transfer of the stacked pallet to the table and transfer of the empty pallet to the discharge conveyor takes place, can be intermediate the highest and lowest levels of the table.

In general, at this intermediate level, an empty pallet is fed to the discharge conveyor simultaneously with the advance of a stacked pallet onto the table from the feed conveyor.

Significant time waste occurs in this system since, for this operation, the destacking table initially must be brought from its highest position at which the last element is removed, into the intermediate position at which a new stacked pallet is shifted onto the table and the empty pallet is transferred from the table to the discharge conveyor, and then the table with the stacked pallet thereon must be lowered into the lowest position or level so that the uppermost element of the stack is located at the destacking level.

The resulting time waste can interrupt feeding to the machine which is processing the individual elements and can result in higher costs of manufacture and significant production losses.

OBJECT OF THE INVENTION

It is, therefore, the principal object of the invention to provide an improved destacking apparatus which will overcome the drawbacks of prior art systems.

Another object of this invention is to provide an improved destacking apparatus in which the dead time or time waste described above can be substantially reduced.

SUMMARY OF THE INVENTION

These objects and others which will become apparent hereinafter are attained, in accordance with the invention, by providing between the feed conveyor and the destacking table in the destacking station or well in which the destacking table is received, a raisable and lowerable transfer table or platform which, during the destacking of a pallet on the destacking table or platform, can receive the next stacked pallet to be destacked and can have its platform level aligned with the platform level of the destacking platform which can correspond to the beginning of destacking of a stacked pallet, and before transfer of the stacked pallet from the receiving platform to the destacking platform, the empty pallet on the latter is discharged.

Advantageously, at the destacking station and in the same well receiving the destacking platform and the receiving platform, a raisable and lowerable discharging platform is provided which can receive the empty pallet from the destacking platform as the new stacked pallet is transferred from the receiving platform to the destacking platform.

More specifically, an apparatus for destacking pallets stacked with stackable elements, especially pallets carrying stacks of paper, can comprise:

a supply conveyor for feeding pallets carrying respective stacks in succession to a destacking station;

means at the destacking station for successively removing the elements from a stack at a predetermined destacking level above the respective pallet;

a vertically displaceable destacking platform receiving a stack-carrying pallet and disposed below the means for raising a stack-carrying pallet to lift the elements successively to the destacking level and for lowering an empty pallet from which the elements have been removed;

a raisable and lowerable receiving platform upstream of the destacking platform and interposed between the supply conveyor and the destacking platform for receiving a stack-carrying pallet in readiness while the stack-carrying pallet on the destacking platform is being destacked, the receiving platform being alignable with the destacking platform at a lowest level thereof for transferring the stack-carrying pallet in readiness to the destacking pallet after the empty pallet has been discharged from the destacking pallet; and a discharging conveyor positioned to carry off the empty pallet from the destacking station.

The invention is based upon the principle that the dead time or time waste of the earlier system described can be significantly reduced when the destacking station is already in its lowest position at the time a stacked pallet is transferred to it. This lowest position can coincide, of course, with the position of the destacking level at the uppermost element of the new stack.

This can be achieved by providing a receiving table in the well upstream of the destacking platform so that it can receive the stacked pallet at an intermediate level, for example, and then be lowered in preparation for transfer of the stacked pallet to the destacking platform when the latter is returned to its lowest position.

The provision of the discharge platform further enhances the operation since there is no need to halt the destacking platform at the intermediate level for discharge of the empty pallet.

According to a feature of the invention, the discharge conveyor can be located at the lowest level of the destacking platform, especially when a discharge platform which can be raised and lowered is not provided, so that the receiving platform can transfer a stacked pallet to the destacking platform at this lowest level.

According to another feature of the invention, the discharge conveyor is located at the same level as the feed conveyor and the transfer of the stacked pallet from the receiving platform to the destacking platform and the transfer of the empty pallet from the destacking platform to the discharge platform are effected at the platform level at which the destacking platform is in its lowest position and the discharge platform can then be shifted to the level of the discharge conveyor to transfer the empty pallet thereto.

In all cases, the platforms can be provided with roller conveyors and the feed conveyor and discharge conveyor can be formed as roller conveyors as well. Preferably all of the roller conveyors and the raising and lowering means of the platforms are motorized and automatically controlled.

Using control systems now conventional in the art of conveyor transfer of material and, generally, in the drive and control technology, rapid passage of articles through the system described can be accomplished and the diagrams required for the aforedescribed movements and kinematics can be planned in advance and preprogrammed into the automatic control or the control readily adapted to predictable needs.

While the apparatus is directed to the destacking of pallets, it will be understood that a kinematic reversal is also possible in which the same apparatus utilized in reverse can be employed to stack pallets with individual elements. In that case, the destacking station will become a stacking station to which the empty pallets are fed in succession via a feed conveyor, will be placed upon a receiving platform and transferred to the stacking platform, the stacked pallet being then transferred to a discharge platform and, subsequently to the discharge conveyor.

BRIEF DESCRIPTION OF THE DRAWING

The above and other objects, features and advantages of the present invention will become more readily apparent from the following description, reference being made to the accompanying drawing in which:

FIG. 3 is a cross-sectional view of another apparatus representing a modification of the system of FIGS. 1 and 2.

DETAILED DESCRIPTION

Figure 1:
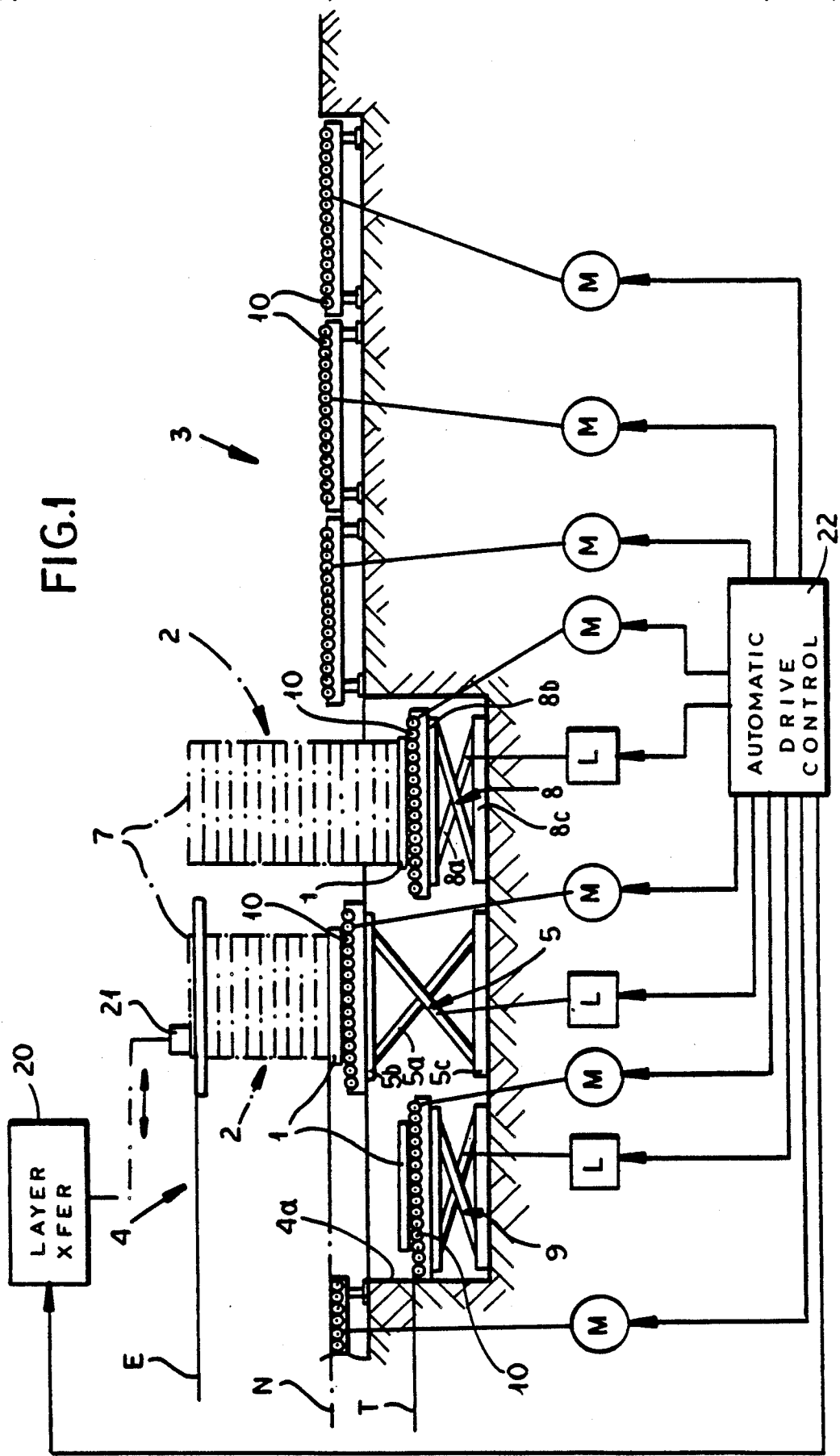
FIG. 1 is a diagrammatic side elevational view, with portions in section, of an apparatus for destacking a stacked pallet according to the invention.
Figure 2:
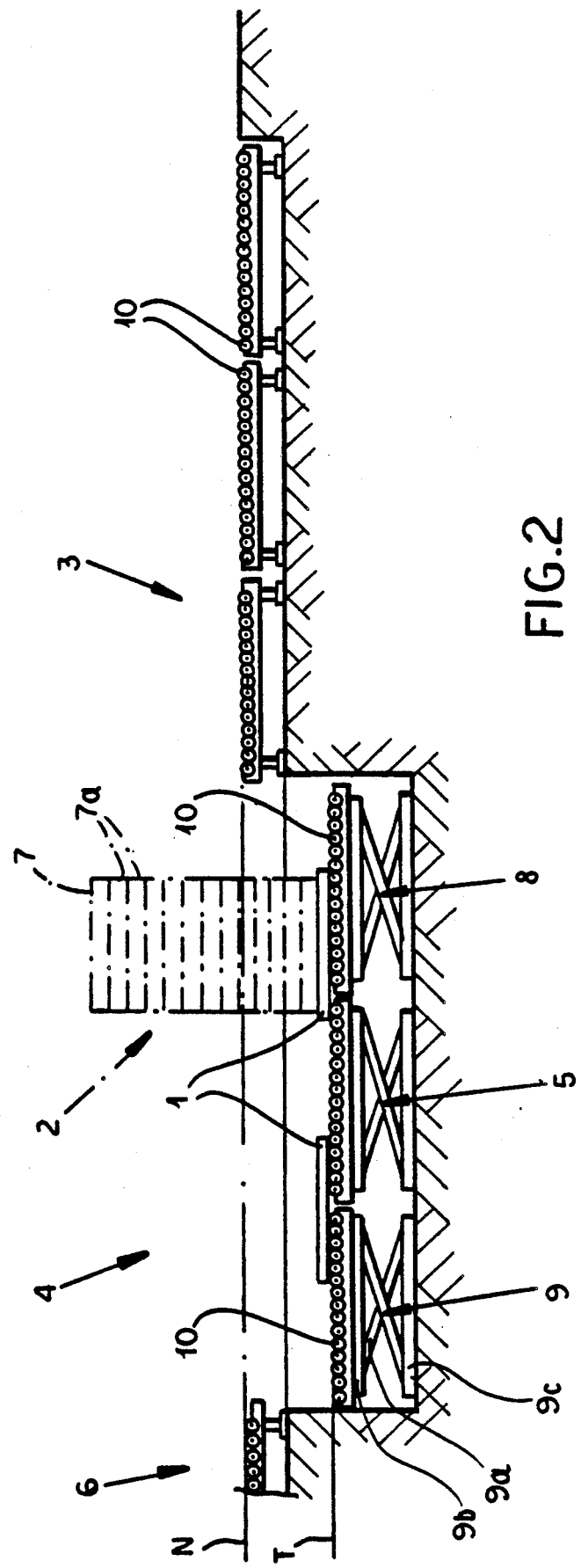
FIG. 2 is a similar view of the apparatus of FIG. 1 in another operating position.

In FIGS. 1 and 2, I have shown an apparatus for the destacking of pallets 1 which can carry stacks 2 of stackable elements 7a, especially, paper, cardboard, paperboard or the like.

The apparatus basically comprises a supply conveyor 10, e.g. a plurality of motor-driven roller conveyors, for feeding the stacked pallets 1, 2 to a destacking station 4, the destacking station which comprises, in a common well 4a, a destacking platform 5 which can be raised and lowered as represented by the scissor linkage 5a between the table 5b of the platform and its base 5c. The table may also have a motor-driven roller conveyor 10. Finally, as to basic elements of the system, the latter can include a discharge conveyor 6 which may also be formed with or as a motor-driven roller conveyor. The motors for driving the various roller conveyors have been represented at M.

The destacking platform 5 can be raised and lowered by a respective actuator L acting upon its scissor linkage 5a. The raising of the platform allows it to always position the uppermost element 7 of the stack at a destacking level E. Thus as the stack 2 is reduced in height, the platform is repeatedly raised to being the uppermost element 7 to the level E. This level E may be the charging level of a machine utilizing the paper elements 7a and located to the left of the apparatus shown in FIGS. 1 and 2 but which has not been illustrated in the drawing.

According to the invention, between the feed conveyor 3 and the destacking table 5, within the well 4a of the destacking station 4, a receiving platform 8 is located. This receiving platform can have a receiving table 8b connected by a scissor linkage 8a to the base 8c. The scissor linkage can be raised and lowered by an actuator L as well, and the table 8b can be provided with a motor-driven roller conveyor 10.

The platform 8 can be charged with a stacked pallet 1, 2 when it is raised to the level N of the feed conveyor 3 and while the destacking platform 5 is advancing the element 7a to the destacking level E at which the uppermost elements 7 are removed in the cycling cadence of the apparatus.

The means for removing the uppermost layer has been indicated generally at 20 and can be seen to have a gripper 21 adapted to seize the uppermost element 7 from above.

Furthermore, during the destacking of the stack on the destacking platform 5, the platform 8 can be lowered to the lowest level of the destacking platform 5, i.e. the level T at which transfer of the stack from the receiving platform 8 is possible.

When the pallet 1 on the destacking platform 5 is emptied, the platform 5 is lowered to its lowermost position T (see FIG. 2) and the empty pallet 1 is transferred to the left onto a discharge platform 9 while the stacked pallet 1, 2 on the receiving platform 8 is transferred onto the destacking platform 5.

The destacking platform 5 can then be raised in a stepwise manner to allow destacking as has been described while the platform 8 can be raised to the level N to receive the next stacked pallet and the platform 9 can be raised to align with the discharge conveyor 6 at level N to forward the empty pallet 1.

For this purpose, the discharge platform 9 can have a roller-conveyor table 9b connected by a scissor linkage 9a to the base 9c and can be raised and lowered by a respective actuator L.

The common automatic drive control 22 can be provided to operate the motors M and the lifting actuators L upon the transfer of the last element of a given stack to repeat the operation as described above.

It is possible to eliminate the discharge platform 9 and, advantageously that expedient is used when the feed conveyor 10 and the discharge conveyor 6 are both located at the lowest level reached by the platform 5, i.e. the level T (see FIG. 3).

I claim:

1. An apparatus for destacking pallets stacked with stackable elements, apparatus comprising:
   a supply conveyor for feeding pallets carrying respective stacks in succession to a destacking station;
   means at said destacking station for successively removing said elements from a stack at a predetermined destacking level above the respective pallet;
   a vertically displaceable destacking platform receiving a stack-carrying pallet and disposed below said means for moving for raising a stack-carrying pallet to lift said elements successively to said level and for lowering an empty pallet from which said elements have been removed;
   a raisable and lowerable receiving platform upstream of said destacking platform and interposed between said supply conveyor and said destacking platform for receiving a stack-carrying pallet in readiness while the stack-carrying pallet on said destacking platform is being destacked, said receiving platform being alignable with said destacking platform at a lowest level thereof for transferring said stack-carrying pallet in readiness to said destacking platform after said empty pallet has been discharged from said destacking platform; and
   a discharging conveyor positioned to carry off said empty pallet from said destacking station.

2. The apparatus defined in claim 1, further comprising a raisable and lowerable discharging platform at said station between said destacking platform and said discharging conveyor alignable with said destacking conveyor to receive said empty pallet therefrom and alignable with said discharging conveyor to transfer said empty pallet thereto.

3. The apparatus defined in claim 1 wherein said discharging conveyor is located at said lowest level and said supply conveyor being located at said lowest level.

4. The apparatus defined in claim 2 wherein said supply conveyor is located at a higher level above said lowest level, said receiving platform being alignable with said supply conveyor at said higher level, said discharging conveyor being located at said higher level and said discharging platform being alignable with said destacking platform at said lowest level to receive said empty pallet and then being raised to said higher level to transfer said empty pallet to said discharging conveyor.

5. The apparatus defined in claim 2 wherein said platforms have conveyors for shifting pallets thereon, all of said conveyors being provided with automatically controlled motors for driving said conveyors, said platforms being provided with automatically controlled operators for raising and lowering same.

6. The apparatus defined in claim 1 wherein said platforms have conveyors for shifting pallets thereon, all of said conveyors being provided with automatically controlled motors for driving said conveyors, said platforms being provided with automatically controlled operators for raising and lowering same.

* * * * *